July 28, 1931.  F. H. VAN HOUTEN  1,816,753
AUTOMATIC DOUGH DIVIDER
Filed Feb. 17, 1931  4 Sheets-Sheet 1
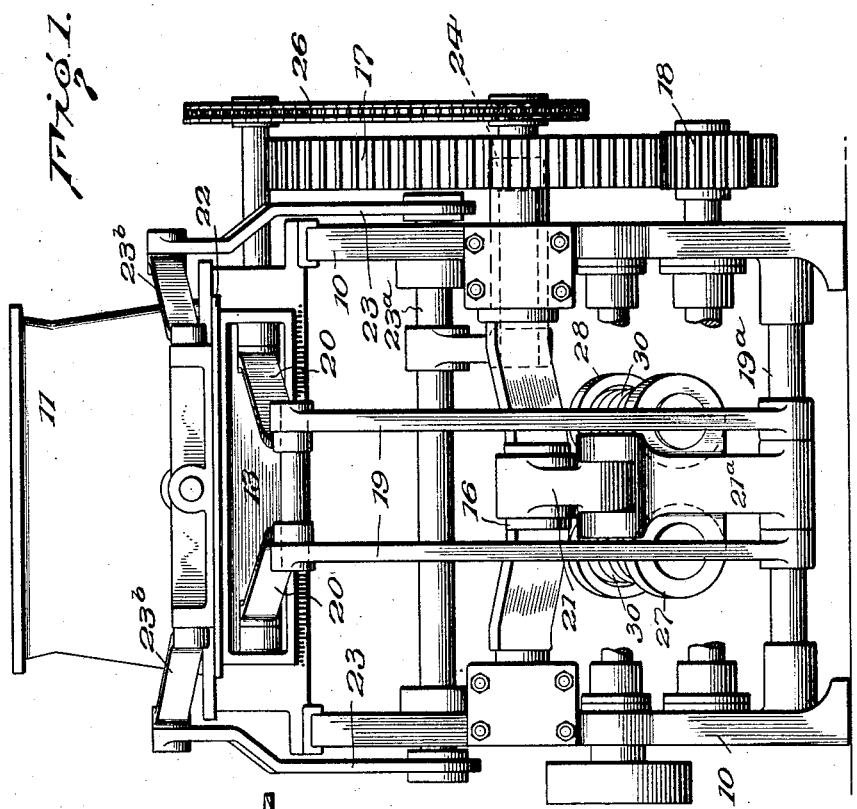
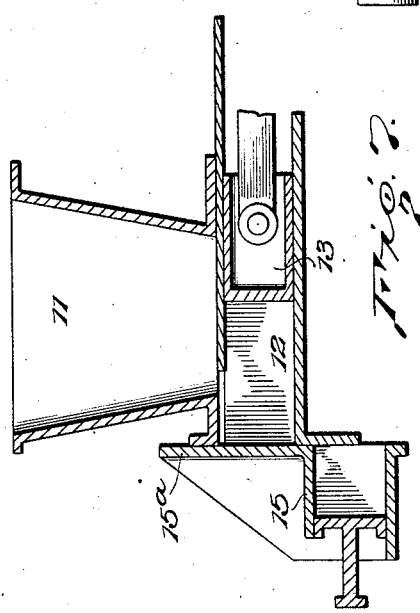
Inventor
Frank H. Van Houten,
By
His Attorneys

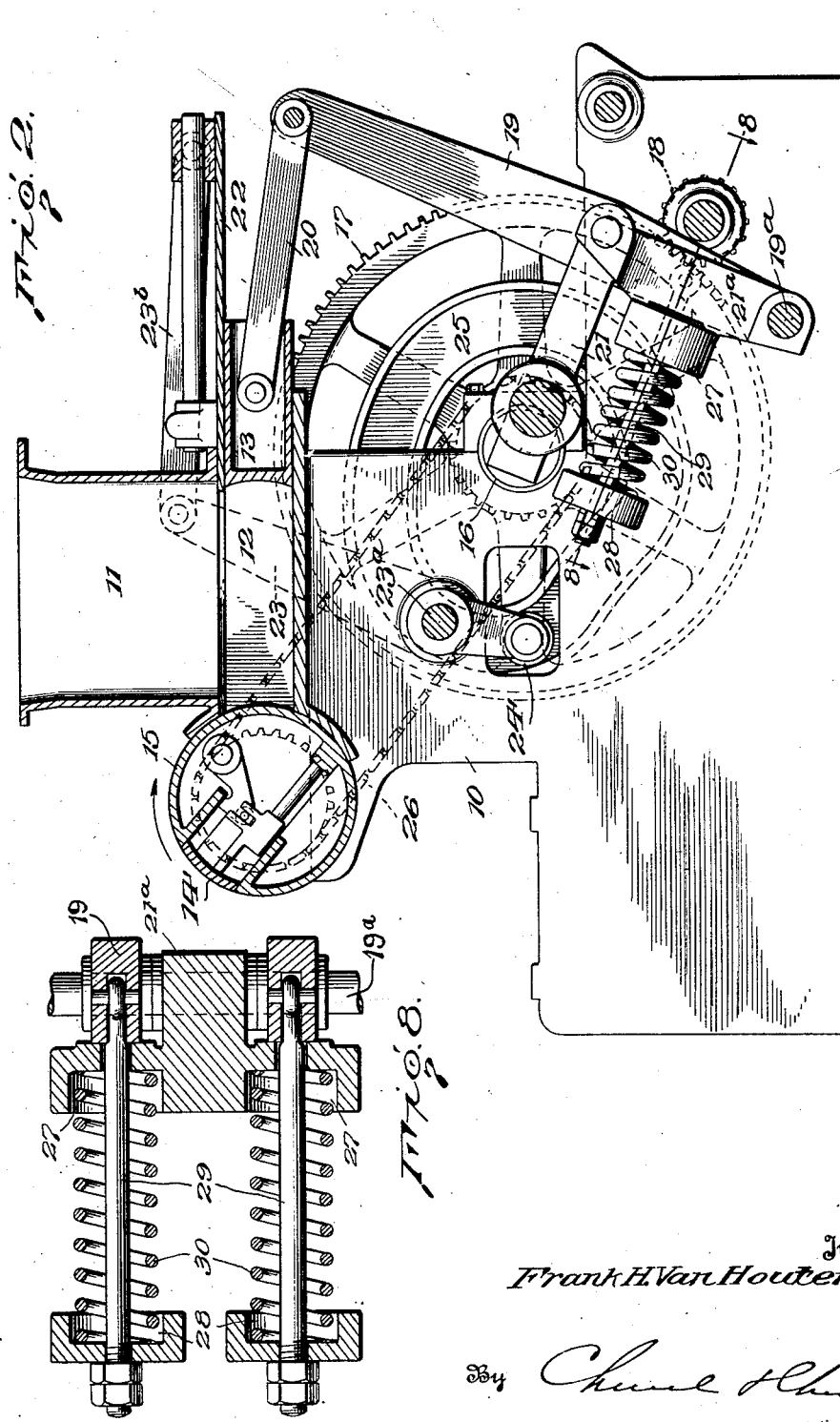

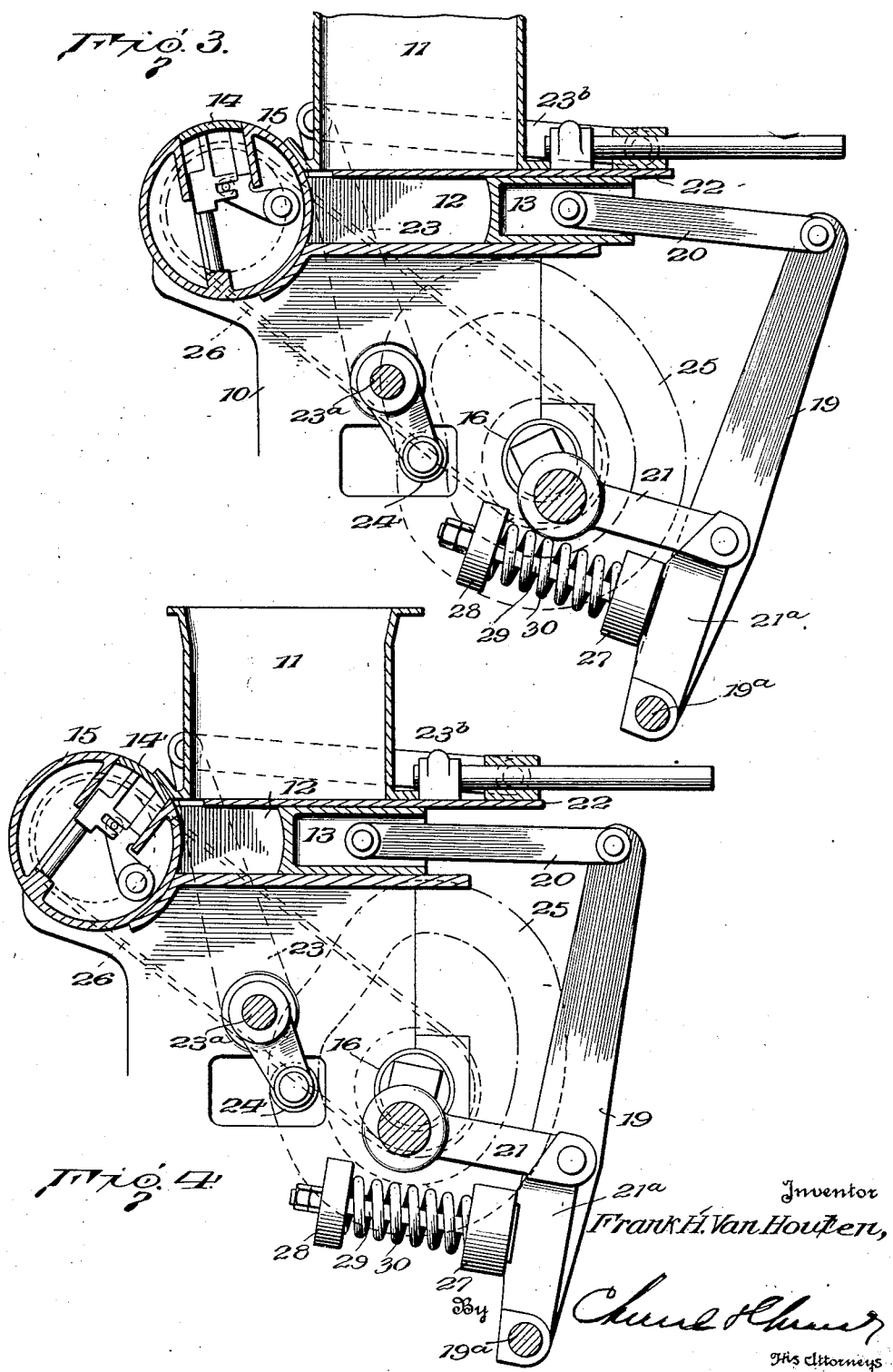

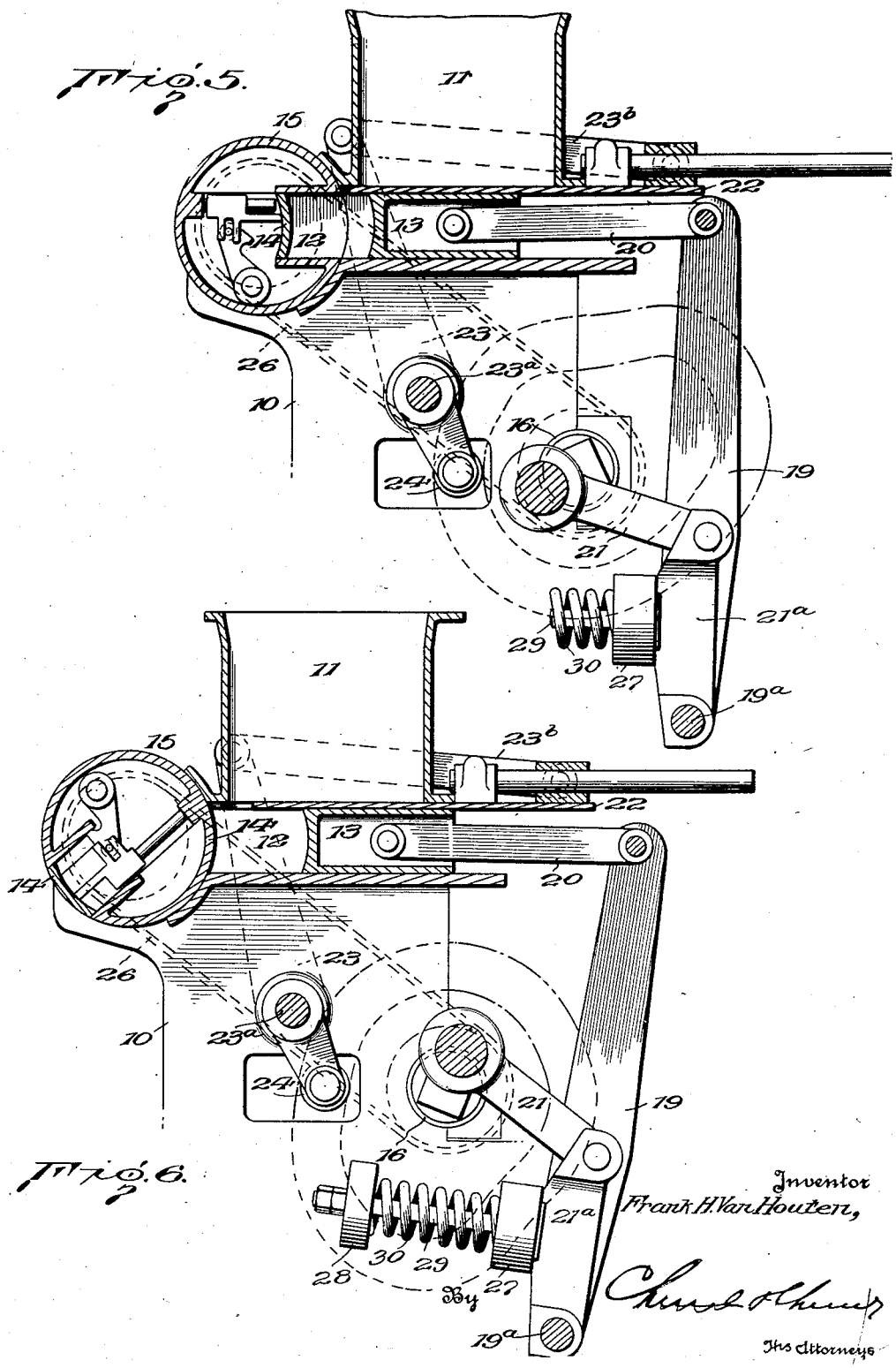

Patented July 28, 1931

1,816,753

UNITED STATES PATENT OFFICE

FRANK H. VAN HOUTEN, OF BEACON, NEW YORK, ASSIGNOR TO DUTCHESS TOOL COMPANY, OF BEACON, NEW YORK, A CORPORATION OF NEW YORK

AUTOMATIC DOUGH DIVIDER

Application filed February 17, 1931. Serial No. 516,404.

This invention relates to improvements in dough handling methods and apparatus and particularly to methods of dividing dough and that type of machine known as dough dividers.

Dough dividers generally comprise a hopper, from which dough is fed by gravity to a compression box. From this compression box, the dough is usually expelled by a plunger into one or more pockets or recesses in what is called a measuring head, because the size or area of each pocket determines the size or volume of the individual lumps of dough thus formed. This method of dividing dough has proved generally satisfactory but nevertheless there have been one or two difficulties which the industry has sought to overcome. The most important ones have been the difficulty of accurately measuring the dough or producing uniform lumps of dough and the difficulty of flowing the dough from the hopper to the compression box. The first difficulty is attributable to the presence of gas in most batches of dough, the gases created by yeast fermentation being trapped in the dough and forming gas pockets therein. Naturally, the weight of individual lumps of dough of the same size will vary in accordance with the amount of gas trapped therein. The second difficulty is also primarily due to the same cause. That is, due to the presence of the gas pockets in the dough, large masses of dough cannot be worked upon to divide it into uniform lumps on account of its elasticity. Hence, comparatively small hoppers and compression boxes must be used. However, when a batch of what is termed hard dough (a batch having a smaller proportion of moisture therein) is to be handled by the machine, it is exceedingly difficult to obtain a proper feed of the dough from the comparatively small hopper into the likewise comparatively small compression box.

In view of the foregoing, the present invention seeks to provide a method and apparatus for dividing dough wherein the effect of the pocketed gas in the dough on the accurate scaling or measuring, will be overcome, and wherein hoppers and compression boxes of substantially any desired size may be utilized.

More particularly, the invention contemplates a method and apparatus wherein a mass of dough considerably larger than the aggregate volume of the pockets in the measuring head is flowed to the compression box. The opening through which the hopper communicates with the box is then partially closed and the dough in the box compressed by the compression box plunger against an unyielding surface. During this initial compression, a portion of the dough is returned from the box to the hopper, as the opening between those elements has been only partially closed. However, by forcing the dough against an unyielding surface, it is substantially thoroughly compacted in the box before it enters the pockets of the measuring head. This insures the presence of only a minimum quantity of gas therein. Again, by forcing the excess dough through the narrow passage back into the hopper, there is a tendency to break up the gas pockets therein, so that when it is next fed into the compression box, it will contain but a small quantity (if any) of gas.

After the dough has been compressed in the box, the pockets of the measuring head are then presented at a point where the dough can be pressed into them from the box by the plunger.

While the invention, in its broader aspect, consists in initially compressing the dough while it is in the compression box against an unyielding surface, and subsequently compressing it in the pockets, a procedure that can be followed with various types of apparatus, the preferred apparatus consists in having a continuously moving measuring head positioned at one end of the box and its movement so synchronized with that of the plunger that during the initial portion of the compression stroke of the plunger, the plan surface of the head will be in registry with the end of the box, but during the latter portion of the compression stroke, the measuring head pockets will be presented to receive the dough which will be forced into them by the plunger.

This preferred form of apparatus is illustrated in the accompanying drawings wherein—

Figure 1 is an end elevation;
Fig. 2 is a side elevation;
Figs. 3 to 6 are a series of views diagrammatically illustrating the persent method; and
Fig. 7 is a detail sectional view illustrating the use of a reciprocating measuring head.
Fig. 8 is a detail sectional view of a portion of the operating connections for the compression box plunger.

In the type of divider illustrated in the drawings, there is mounted above the main frame 10, a hopper 11, from which dough may gravitate or flow into a compression box 12, except when the opening between said hopper and box is closed by a reciprocatory knife 22. Slidable in said box 12 is a plunger 13 by which dough in the box may be compressed and forced into pockets in a measuring head 15. Said head may be provided with any number of pockets spaced longitudinally thereof, and in each pocket there is a plunger 14 adapted to be retracted when dough is forced into the pockets. The connections, control and operation of these plungers are fully disclosed in Patents, Nos. 1,703,126 and 1,740,049.

As before set forth, the present invention contemplates a method which will effect a compression of the dough, while in the compression box, to an extent that will thoroughly compact the dough and thereby eliminate a considerable portion, if not all of the gas, usually pocketed in softer doughs. Accordingly, the several parts above described are so operated in timed relation to one another, that the compression box plunger 13 will be advanced at a time when an unyielding surface is presented at the opposite end of the box 12. In the present instance this is accomplished by continuously rotating the measuring head 15 with the movement thereof so timed with respect to the reciprocation of plunger 13 that during the initial advance of the plunger the solid portion of the periphery of the head will be presented at the end of the box but after the dough has been compressed in the box and is ready to be forced into the measuring head pockets, the latter will be presented at the end of the box. In connection with this compacting of the dough in the box, the knife 22 is so actuated that during the initial advance of the plunger 13, said knife will also be advanced at a greater speed to a point where the opening between box 12 and hopper 11 is not quite closed. The restricted opening thus left between the box and hopper, permits excess dough in the box to be returned to the hopper as the plunger 13 advances. In this way, a box of larger volume than the volume of the several measuring head pockets combined can be utilized. This use of a large box facilitates the flow of dough from the hopper and insures the presence in the box of a quantity of dough sufficient to fill the pockets. In fact, an excess of dough is always delivered to the box, the excess being returned to the hopper through the narrow opening left by the only partially closed knife 22. This is important because when the excess dough is forced through the restricted opening, gas pockets therein are broken or ruptured so that when the same portion of the dough is again fed into the box it is substantially free of gas and enters the pockets in a more homogeneous state. As before stated, the preliminary compression of the dough while in the box against the unyielding surface of the measuring head practically insures an accurate scaling or measuring of the lumps in the pockets regardless of the volume of gas originally pocketed in the dough.

The several steps of this method have been more or less diagrammatically illustrated in Figs. 2 to 6. Power from a suitable source revolves gear 18 in mesh with the larger gear 17 on a main shaft 16. On the main shaft 16 is a cam member having a cam way 25 for a cam roller 24 carried by a lever 23 pivoted at 23$^a$ and connected by a link 23$^b$ to the knife 22. Connected eccentrically to the main shaft 16 is also a link 21 for rocking levers 19 pivoted at 19$^a$ and connected by links 20 to the compression box plunger 13. The measuring head 15 is continuously rotated by a drive chain 26 from the main shaft 16.

The contour of the cam slot 25 and the speed of rotation of measuring head 15 is such that with the parts in the positions illustrated in Fig. 2, their operation for a complete cycle is as follows: Rotation of the cam to the position shown in Fig. 3 slightly advances the plunger 13 and all but closes the opening between the box and hopper by advancing knife 22 to the position shown in this figure. Continued movement of the cam further advances the plunger while the knife remains stationary as shown in Fig. 4. Also as shown in Figs. 3 and 4, during this portion of the advance of the plunger, the unyielding surface of the measuring head is presented to the dough then being compressed by the plunger. As shown in Fig. 5, however, the further movement of the head has brought the pockets in registry with the box 12. At the same time, knife 22 has been moved to its fully closed position and plunger 13 advanced to force the dough into the pockets. Further movement of these several elements carries the pockets beyond the box, as shown in Fig. 6, severing the dough therein from any dough remaining in the box. The dough in the pockets is discharged therefrom at the proper point by the action of pocket plungers 14. The retraction of the knife 22 and box plunger 13, indicated in Fig. 6, is continued until those elements assume the positions in which they are shown in Fig. 2.

In the event dough in box 12 offers excessive resistance to the forward movement of plunger 13, means are provided for permitting levers 19 to remain stationary, regardless of the movement of shaft 16. Such means consist essentially of sockets 27 on a short lever 21a on shaft 19a and these sockets form seats for the ends of coil springs 30 whose opposite ends seat in cup-like members 28. Bolts 29 secured to levers 19, extend through the sockets 27, 28 and the springs 30. So long as plunger 13 advances, levers 19 and 21a will move in unison but upon plunger 13 encountering excessive resistance, lever 21a moves independently of levers 19, under which circumstances springs 30 will be compressed between the seats 27, 28.

In Fig. 7, there is illustrated the hopper 11 and box 12 of a dough divider, having a measuring head 15 of the reciprocatory type, said head having a skirt 15ª that is presented to the box during the compression of the dough in the box by the plunger 13. In both types of machine, the same method is carried out in that a quantity of dough in excess of that necessary to fill the pockets is delivered from the hopper to the box and compressed therein against an unyieldingly surface before it is forced into the pockets, some of the dough being returned to the hopper through the restricted opening left by the only partially advanced knife.

What I claim is:

1. The method of dividing dough which consists in delivering a quantity of dough from a hopper or reservoir to a compression box, moving a closure partially across the opening between said hopper and box, compressing the dough in said box against an unyielding surface and returning a portion thereof to the hopper and fully closing said opening with said closure and removing said unyielding surface and further compressing the dough remaining in the box in the pocket of a dough receiving member.

2. The method of forming accurately measured lumps of dough comprising feeding dough from a storage space into a compression space, partially severing the dough in the compression space with a dough severing element from that remaining in the storage space, positioning an unyielding surface against one end of the compression space, compressing the dough in the compression space against said unyielding surface and returning the excess dough therefrom to the storage space, completing the severing of the dough in the compression space from that in the storage space with said severing element, and delivering the dough from the compression space into a lump receiving chamber.

3. In a dough dividing apparatus, the combination of a compression box, a hopper opening in said box, a measuring head having an unyielding surface with a measuring pocket therein, a knife adapted to close the opening between the box and hopper, a reciprocatory plunger for compressing dough delivered from the hopper in said box against said unyielding surface of the measuring head and for transferring dough from the box into said measuring pocket, means for initially moving said knife to only partially close the opening between the hopper and box until the plunger has been partially advanced in said box, means for positioning the unyielding surface of the head across one end of the box during the initial advance movement of the plunger and for moving said pocket in registry with the end of the box during the subsequent advance of the plunger, and means for subsequently moving said knife to fully close said opening before and during the further advance of said plunger.

4. In a dough dividing apparatus, the combination of a compression box, a hopper opening into said box, a measuring head closing one end of said box, said head having an unyielding surface with a measuring pocket therein, a knife slidable across the opening between the hopper and box to close the same, a reciprocatory plunger in said box to compress dough therein and transfer it to said pocket, means for advancing said knife across said opening with an intermittent movement, means for advancing said plunger in said box with a continuous movement, and means for positioning the unyielding surface of the head across the end of the box during the initial advance of the plunger and for moving said pocket in registry with the end of the box during the subsequent advance of the plunger.

5. In a dough dividing apparatus, the combination of a compression box, a hopper opening into said box, a head closing one end of the box, said head having an unyielding surface with a measuring pocket therein, a knife adapted to close the opening between the box and hopper, a reciprocatory plunger for compressing dough delivered from the hopper in said box and transferring it to the measuring pocket, means for initially moving said knife to only partially close the opening between the hopper and box until the plunger has been partially advanced in the box and for subsequently moving said knife to fully close said opening during the further advance of said plunger, and means for continuously moving said measuring head across the end of the box, the movement of said head being so timed with respect to the movement of the plunger that the unyielding surface of the head will be presented at the end of the box during the initial advance of the plunger and the pocket in said head will be in registry with the end of the box during the subsequent advance of said plunger.

FRANK H. VAN HOUTEN.